Jan. 12, 1954     J. M. WILSON     2,666,106
DEFLATION INDICATOR FOR PNEUMATIC TIRES
Filed Sept. 8, 1950
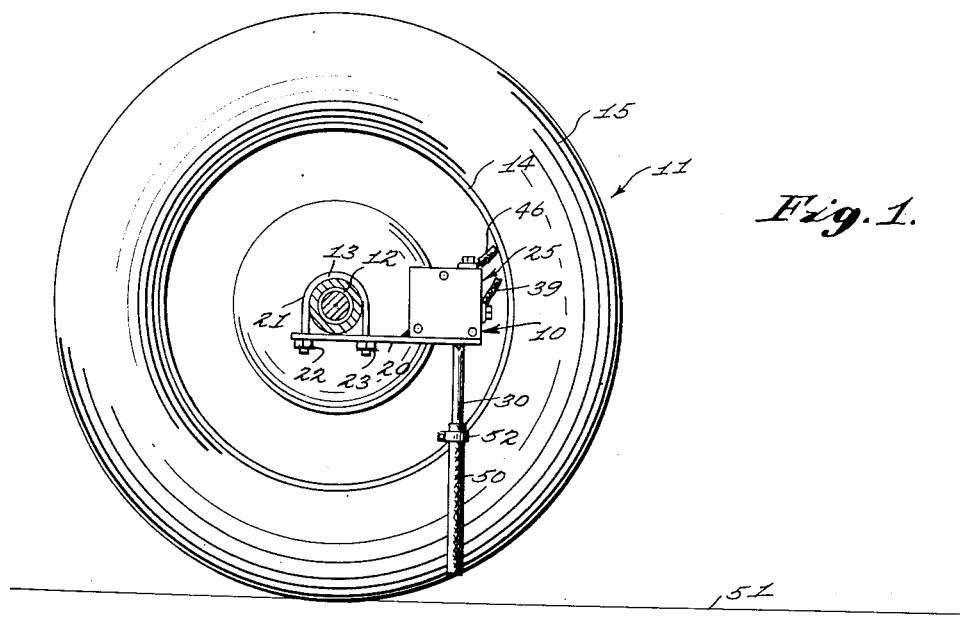
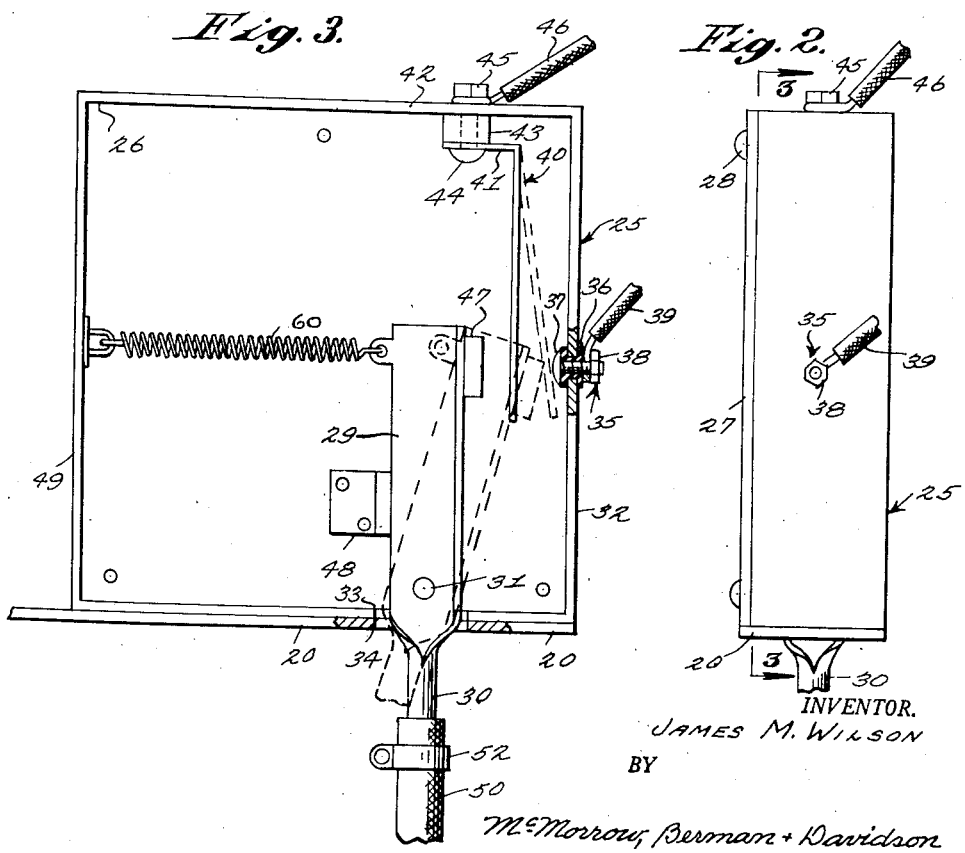
INVENTOR.
JAMES M. WILSON
BY
McMorrow, Berman + Davidson
ATTORNEYS Patented Jan. 12, 1954

2,666,106

UNITED STATES PATENT OFFICE 2,666,106

DEFLATION INDICATOR FOR PNEUMATIC TIRES

James Montjoy Wilson, Vancouver, Wash.

Application September 8, 1950, Serial No. 183,838

2 Claims. (Cl. 200—61.23)

This invention relates to a deflation indicator for a pneumatic tire.

An object of this invention is to provide a deflation indicator which is adapted to warn a vehicle driver by an audible signal when a tire of the vehicle becomes partially or totally deflated.

Another object of this invention is to provide a deflation indicator which can be mounted with speed and facility in operating position adajacent the front and rear tires of a motor vehicle.

A further object of this invention is to provide a deflation indicator adapted to warn a vehicle driver to stop for repairs when a pneumatic tire begins to lose its pressure due to a blowout or slow leak.

A still further object of this invention is to provide a deflation indicator adapted to warn a vehicle driver when a tire of the vehicle becomes deflated by a predetermined amount.

A still further object of this invention is to provide a pneumatic tire deflation indicator which is relatively simple in structure and cheap to manufacture.

The above and still further objects and advantages of the invention will become apparent upon consideration of the following detailed description of the invention, when taken in conjunction with the accompanying drawings, wherein:

Figure 1 is a side elevational view of the deflation indicator of the present invention, shown supported on the wheel assembly of a vehicle;

Figure 2 is an end elevational view of the inflation indicator taken from the right of Figure 1; and Figure 3 is an elevational view, with parts broken away and shown in section, taken along the line 3—3 of Figure 2.

Referring now more particularly to the drawings, wherein like reference numerals have been used throughout the several views to designate like parts, there is shown the deflation indicator of the present invention, generally designated by the reference numeral 10, supported on a wheel assembly 11 including an axle 12, an axle-supporting housing 13, a wheel rim 14, and a pneumatic tire 15 circumposed about and supported on the wheel rim 14.

The deflation indicator embodies a plate 20 having one end disposed beneath and transversely of the axle housing 13 and secured thereto by means of an inverted, U-shaped bracket 21 having each of its legs extending through the plate 20, the free ends of the legs carrying the bolts 22 and 23. Resting upon the other end of the plate 20 and secured thereto is an upstanding housing 25 which has an open side 26 provided with a detachable cover plate 27 which is normally secured in place by means of the spaced bolts 28.

Supported by the housing 25 is a lever 29 which has one end 30 projecting exteriorly of and below the housing 25 and has an intermediate portion mounted on the housing 25 by means of the pin 31 for rocking movement about a horizontal axis in a vertical plane toward and away from the end wall 32 of the housing 25. The projecting end 30 of the lever 29 is extended through alignable slots 33 and 34 provided in the bottom of the housing 25 and in the adjacent portion of the plate 20.

Carried by the end wall 32 of the housing 25 is an electrical contact 35 which embodies an insulating sleeve 36 mounted on the wall 32 of the housing 25, the sleeve 36 supporting a bolt 37, which has its head disposed interiorly of the housing 25. Detachably secured to the bolt 37 by means of the nut 38 is a wire 39 which is connected to one terminal of a remote, two-terminal, audio signalling device, such as a bell, not shown.

Supported within the housing is a resilient contact arm 40 which has one end laterally offset, as indicated by the reference numeral 41, and dependingly supported from the top wall 42 of the housing 25. The laterally offset end 41 of the resilient contact arm 40 is supported by means of an insulating sleeve 43 and a bolt 44 which has its head disposed interiorly of the housing 25 and has its shank extending exteriorly of the latter. Detachably secured to the exteriorly projecting end of the bolt 44 by means of the nut 45 is a wire 46 which is detachably secured to the other terminal of the two-terminal signalling device, not shown. As clearly shown in Figure 3, the free depending end of the resilient contact arm 40 is disposed in the path of movement of the lever 29, whereby, upon movement of the lever toward the end wall 32, the resilient contact arm is urged into engagement with the head of the bolt 37 of the electrical contact 35 to thereby complete the electrical circuit for the signalling device. As clearly shown in Figure 3, the side face of the lever 29 contiguous to the resilient contact arm 40 is provided with an insulating block 47.

Contiguous to the opposite side face of the lever 29 is a stop member 48 which is secured to the housing 25 and limits the movement of the lever 29 away from the end wall 32 of the housing 25.

Extending between the lever 29 and the wall 49 of the housing 25 opposite the end wall 32 is a spring 60 which has one end secured to the lever 29 and has the other end secured to the wall 49, and normally biases the lever 29 into engagement with the stop lock 48.

Positioned exteriorly of the housing 25 is a flexible element 50 which has one end dependingly secured to the projecting end 30 of the lever 29, and has the other end terminating adjacent to and spaced above the tire-supporting surface 51, whereby a predetermined deflation of the tire brings the terminating end of the flexible element 50 into contact with the supporting surface to thereby effect the rocking movement of the lever toward the end wall 32 as the wheel 15 traverses the ground surface 51. The flexible element 50 may be a length of hose which has one end circumposed about the projecting end 30 of the lever 29 and detachably secured thereto by means of a clamp 52. By selectively varying the spacing of the terminating end of the flexible element 50 with respect to the ground surface 51, the amount of deflation of the tire 15 required prior to contact between the flexible element 50 and the ground can be controlled. It is to be noted that the clockwise movement of the lever 29 about the pivotal axis 31 is effected by a clockwise rotary movement of the wheel assembly about the axle 12.

In actual use, the deflation indicator 10 can be detachably secured to any vehicle by means of the U-shaped bracket 21 or any other suitable means. The spacing of the free terminating end of the flexible element 50 can be adjusted with respect to the ground surface 51 by means of the clamp 52 to thereby predetermine the amount of deflation requisite prior to the completion of the electrical circuit for the signalling device employed.

Although only one embodiment of the deflation indicator of the present invention has been described, it is readily apparent that numerous modifications can be made without departing from the spirit of the invention as set forth in the appended claims.

What I claim is:

1. A tire deflation indicator for a pneumatic tire comprising a housing positioned above said tire, said housing having a bottom wall, spaced side walls rising from the bottom wall, an end wall at each of the ends of the side walls and secured to the later walls and said bottom wall, and a top wall secured to the side and end walls, a vertically disposed lever positioned within said housing adjacent to and spaced from one of the end walls of said housing and connected to one of the side walls of said housing intermediate its ends for rocking movement about a horizontal axis in a vertical plane toward and away from said one end wall of said housing, said lever extending through the bottom wall of said housing and having the lower end exteriorly of and spaced from the bottom wall of said housing and having the upper end below and spaced from the top wall of said housing, a flexible element having one end connected to the lower end of said lever and having the other end adjacent to and spaced above a tire supporting surface, a coil spring having one end connected to the other of the end walls of said housing and having the other end connected to the upper end of said lever for biasing said lever away from said one end wall of said housing, an electrical contact positioned adjacent the upper end of said lever and carried by said one end wall of said housing, and a vertically disposed resilient contact arm positioned within said housing and having the upper end fixedly secured to the top wall of said housing, the lower end portion of said contact arm being between and spaced from the upper end of said lever and said contact.

2. A tire deflation indicator for a pneumatic tire comprising a housing positioned above said tire, said housing having a bottom wall, spaced side walls rising from the bottom wall, an end wall at each of the ends of the side walls and secured to the latter walls and said bottom wall, and a top wall secured to the side and end walls, a vertically disposed lever positioned within said housing adjacent to and spaced from one of the end walls of said housing and connected to one of the side walls of said housing intermediate its ends for rocking movement about a horizontal axis in a vertical plane toward and away from said one end wall of said housing, said lever extending through the bottom wall of said housing and having the lower end exteriorly of and spaced from the bottom wall of said housing and having the upper end below and spaced from the top wall of said housing, a flexible element having one end connected to the lower end of said lever and having the other end adjacent to and spaced above a tire supporting surface, a coil spring having one end connected to the other of the end walls of said housing and having the other end connected to the upper end of said lever for biasing said lever away from said one end wall of said housing, an electrical contact positioned adjacent the upper end of said lever and carried by said one end wall of said housing, a stop member carried by one of the side walls of said housing and engageable with said lever intermediate the upper end thereof and said axis for limiting the movement of said lever away from said one end wall of said housing, and a vertically disposed resilient contact arm positioned within said housing and having the upper end fixedly secured to the top wall of said housing, the lower end portion of said contact arm being between and spaced from the upper end of said lever and said contact.

JAMES MONTJOY WILSON.

References Cited in the file of this patent

UNITED STATES PATENTS

| Number | Name | Date |
|---|---|---|
| 1,638,983 | Crone | Aug. 16, 1927 |
| 2,213,782 | Kite | Sept. 3, 1940 |

FOREIGN PATENTS

| Number | Country | Date |
|---|---|---|
| 330,592 | Italy | Oct. 14, 1935 |
| 663,928 | France | Apr. 15, 1929 |
| 762,936 | France | Jan. 29, 1934 |